(12) United States Patent
Moore

(10) Patent No.: US 8,140,482 B2
(45) Date of Patent: Mar. 20, 2012

(54) USING RSS ARCHIVES

(76) Inventor: James F. Moore, Cambridge, MA (US)

( * ) Notice: Subject to any disclaimer, the term of this patent is extended or adjusted under 35 U.S.C. 154(b) by 610 days.

(21) Appl. No.: 12/233,266

(22) Filed: Sep. 18, 2008

(65) Prior Publication Data

US 2009/0077040 A1 Mar. 19, 2009

Related U.S. Application Data

(60) Provisional application No. 60/973,480, filed on Sep. 19, 2007, provisional application No. 61/082,802, filed on Jul. 22, 2008.

(51) Int. Cl.
G06F 7/00 (2006.01)
G06F 17/00 (2006.01)

(52) U.S. Cl. ........................................ 707/661; 707/667

(58) Field of Classification Search .................. 707/661, 707/664, 667, 668, 665
See application file for complete search history.

(56) References Cited

U.S. PATENT DOCUMENTS

| | | | | |
|---|---|---|---|---|
| 7,421,155 B2* | 9/2008 | King et al. | ..................... | 382/312 |
| 7,904,367 B2* | 3/2011 | Chung et al. | ................. | 705/36 R |
| 8,010,282 B2* | 8/2011 | Barry et al. | .................... | 701/204 |
| 2005/0198021 A1* | 9/2005 | Wilcox et al. | ..................... | 707/3 |
| 2007/0061393 A1* | 3/2007 | Moore | ........................... | 709/201 |
| 2008/0141126 A1* | 6/2008 | Johnson et al. | ............... | 715/273 |

* cited by examiner

*Primary Examiner* — Don Wong
*Assistant Examiner* — Merilyn Nguyen
(74) *Attorney, Agent, or Firm* — GTC Law Group LLP & Affiliates; John A. Monocello, III; Charles Cella

(57) ABSTRACT

In some aspects, at least two different probes are applied to datafeed archives to derive information based on data in the archives. The probes are part of a probe plan to determine a result based on the derived information. The result is determined based on the derived information.

17 Claims, 3 Drawing Sheets

USING RSS ARCHIVES

CLAIM OF PRIORITY

This application claims priority under 35 USC §119(e) to provisional U.S. Patent Application 60/973,480, filed on Sep. 19, 2007 and to provisional U.S. Patent Application 61/082,802, filed on Jul. 22, 2008, the entire contents of which are hereby incorporated by reference.

TECHNICAL FIELD

Using data feed archives such as RSS archives is described herein.

Internet searching has attracted significant activity aimed at improving the speed, scope, and relevance of search results. Some companies have also leveraged popular search engines into related areas such as targeted advertising and specialty searches. Beneath these web-based or programming-interface-based search systems lay technologies for locating content, indexing content, and determining the relevance of content in response to particular search requests. Often such systems focus on finding content among the billions of web pages and other content items on the World Wide Web.

As RSS becomes an increasingly popular medium for Internet communications and communities, there as an increasing need to store and index historical RSS data. A system and method for searching content specific sources, metadata sources, and distribution channels such as archived RSS datafeed information is described herein.

Several types of archival formats may be usefully employed for RSS.

In one aspect, an archival format may permit full reconstruction of any historical RSS feed. The archived data may include time-stamping or other certification of time so that publication dates are accurately and non-repudiatably preserved.

In another aspect, an archival format may extract and more efficiently store elements of an RSS feed, such as text, enclosures, and the like. This data may be stored according to relevant tags, with certain tags and tagged content being removed. In another aspect, the original RSS content may be processed for archiving. For example, the text portion may be enhanced based on what appears in HTML source code for an item, or from a feed.

It will be understood that the archival format may be standardized so that a corresponding database will include suitable fields or indices for generalized or specific post-archiving uses. For example, time stamps may be used as noted above. As another example, certain feed or item metadata from the HTML code may be extracted and stored with item content. In particular, information such as source information, author, unique ID or permalink data, and so forth, may be extracted in order to uniquely identify RSS text after surrounding HTML or XML based metadata has been removed for archiving.

The extracted data may be added directly to a text form of the item for archiving. In another aspect, the extracted data may be stored in a suitably configured relational database or other storage medium.

It will be further appreciated that the archival format may be supplemented with additional data not present in the feed or item HTML. For example, semantic metadata may be generated relating to popularity, subject matter, usage, or other characteristics of a particular item, or a feed from which the item was obtained.

An archive may be adapted for specific or general use. For example, a market-specific archive (e.g., real estate, medical, financial, and so forth) may be created that is supplemented with relevant metadata. And for each market, certain existing metadata may be retained in the archival format or dispensed with entirely.

In some aspects, a method includes processing two or more independent RSS data feeds to generate two or more RSS market specific searchable RSS datafeed archives. The method also includes generating, using a master probe device, a probe plan based on an input received from a user. The method also includes applying, using a plurality of slave probe devices, at least two different probes to the archives to derive information based on data in the searchable RSS datafeed archives, the probes being part of the probe plan to determine a result based on the derived information. At least one of the probes is applied to at least two of the searchable RSS datafeed archives and at least two of the probes are applied to the same searchable RSS datafeed archive. The method also includes determining the result based on the derived information and generating an RSS feed that includes the result.

Embodiments can include one or more of the following.

The market specific datafeed archives can include one or more of a real estate datafeed archive, a medical datafeed archive and a financial datafeed archive.

Processing the two or more independent data feeds can include storing metadata and an automatically generated importance value.

Generating the probe plan can include using a master engine to generate the probe plan.

Determining the result can include receiving sub-results from one or more of the at least two different probes, the sub-results differing in structure and format, and combining the sub-results to generate the result.

Combining the sub-results can include identifying a first sub-result that is a duplicate or near duplicate of a second sub-result and generating a hyperlink to the second sub-result.

In some additional aspects, a method includes processing two or more independent data feeds to generate two or more searchable datafeed archives. The method also includes applying at least two different probes to the archives to derive information based on data in the archives, the probes being part of a probe plan to determine a result based on the derived information, at least one of the probes being applied to at least two of the archives. The method also includes determining the result based on the derived information and providing the result for use in a real-world application.

Embodiments can include one or more of the following.

The searchable datafeed archives can include RSS searchable datafeed archives.

Processing the two or more independent datafeeds can include processing the two or more independent datafeeds to generate market specific datafeed archives.

The market specific datafeed archives can include one or more of a real estate datafeed archive, a medical datafeed archive and a financial datafeed archive.

Processing the two or more independent data feeds can include storing metadata and an automatically generated importance value.

The method can also include generating the probe plan based on an input received from a user.

Generating the probe plan can include using a master engine to generate the probe plan.

The probes can have differing structures.

Determining the result can include receiving sub-results from one or more of the probes, the sub-results differing in structure and format. The method can also include combining the sub-results to generate the result. Combining the sub-results can include identifying a first sub-result that is a duplicate or near duplicate of a second sub-result and generating a hyperlink to the second sub-result.

Providing the result can include generating an RSS feed that includes the result.

In some additional aspects, a method includes generating, based on a probe plan and a search request, probes, the probes differing from one another and configured to search market specific searchable datafeed archives. The method also includes receiving, in response to the probes, sub-results from one or more of the probes. The method also includes determining a result based on the sub-results and providing the result for use in a real-world application.

Embodiments can include one or more of the following.

The searchable datafeed archives can be RSS searchable datafeed archives.

The market specific datafeed archives can include one or more of a real estate datafeed archive, a medical datafeed archive and a financial datafeed archive.

The probes can have differing structures.

Determining the result can include receiving sub-results from one or more of the probes, the sub-results differing in structure and format. The method can also include combining the sub-results to generate the result.

Providing the result can include generating an RSS feed that includes the result.

It will be understood that while RSS is used herein as a convenient and commonly used example of an XML-based and syndication-ready grammar, other XML-based systems may be suitably archived using the techniques described herein including without limitation other syndication technologies (such as Atom) and other grammars such as OPML for outlining and so forth.

Metadata may be extracted from an RSS channel description, or from a particular RSS item. This includes any metadata encoded in the HTML associated with an RSS item. This metadata may be directly extracted for storage, or may be analyzed by an analysis engine for purposes of filtering, enriching, or otherwise processing the metadata to produce new metadata associated with the item (or the channel). However obtained, a selected portion of extracted or derived metadata may be stored with an RSS archival format.

Content, typically text but also including enclosures of any form or other content contained within an RSS item, may also be extracted for storage in the archival format. In addition, the content may itself be analyzed by the analysis engine, and metadata may be generated based upon the content either alone or in combination with other available metadata, for storage with the other metadata of the archival format.

The archival format may take any suitable form including an archival XML grammar, a simple text document (which may be subject to one or more constraints to preserve archival metadata such as key value pairs, metadata delimiters, or the like). The archival format may also be preserved in a suitably constructed database which may be indexed, for example, by content, metadata, or a combination of these.

All such variations and others may be employed with the systems described herein.

These and other aspects and features, and combinations of them, may be expressed as methods, apparatus, systems, program products, databases, methods of doing business, and means for performing functions, and in other ways.

Other aspects and features will become apparent from the following description and from the claims.

DETAILED DESCRIPTION

Figure 1:
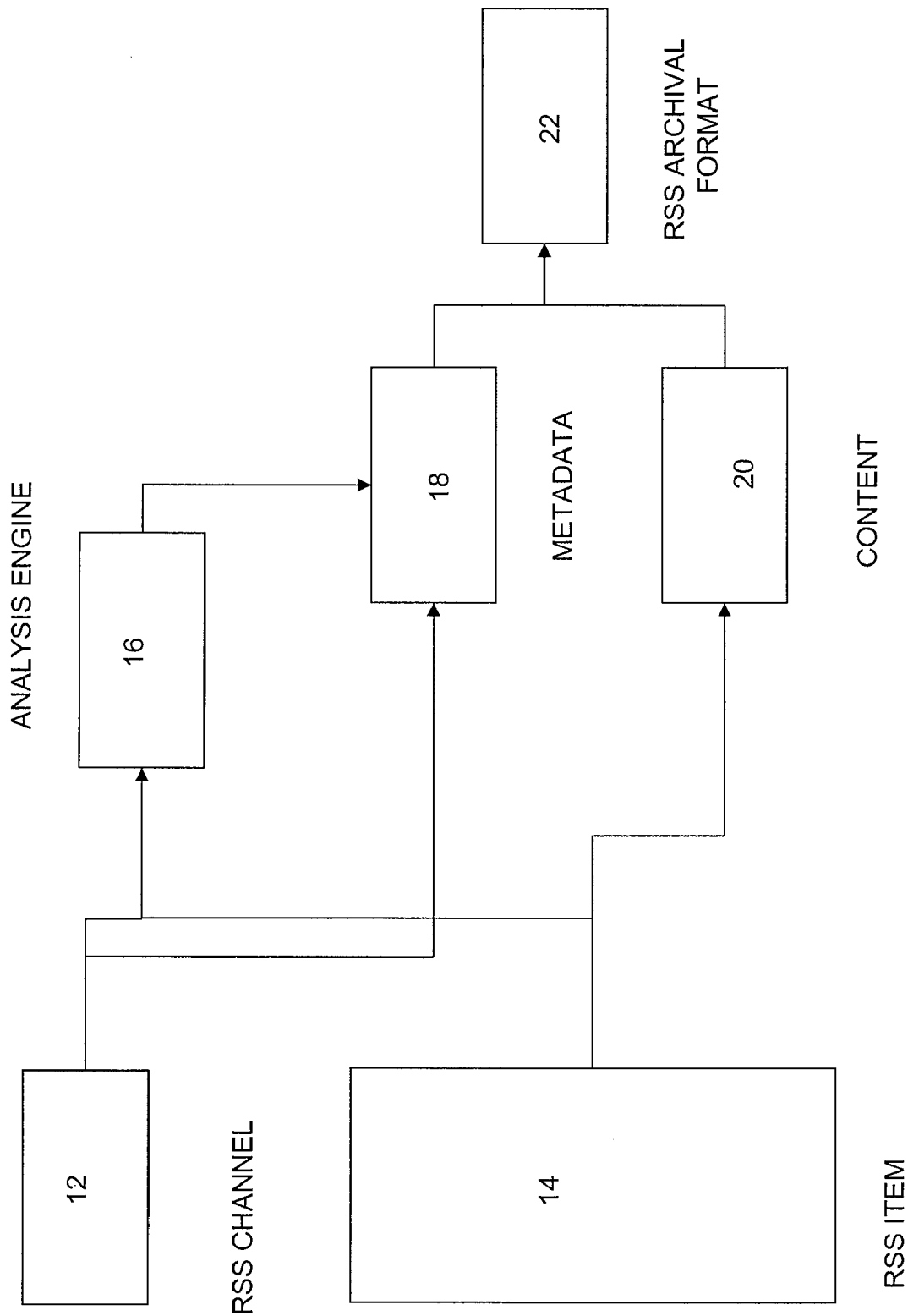
FIG. 1 is a block diagram of an RSS archive system.

Referring now to FIG. 1, an RSS channel 12 may comprise an XML data feed in the RSS format, the Atom format, or any and all other suitable formats. The RSS channel 12 may comprise one or more RSS items 14, which may encompass data structures that are formatted according to the RSS 2.0 specification, the Atom specification, or any and all other suitable specification. In embodiments, such specifications may be expressed in DTD, XML Schema, or any and all other schema language or the like. Each RSS item may encompass content 20 such as and without limitation bits, bytes, strings, binaries, and so on. In embodiments, the content 20 may be organized into elements, each of which may be associated with a data type and/or a unique identifier.

Any and all instances of content 20 (and, therefore, any and all instances of an RSS channel or item) may comprise or be associated with metadata 8. In embodiments, an analysis engine 16 may process instances and generate the metadata 8 as a result of the processing. This processing may be entirely automatic, such as and without limitation according to an algorithm, heuristic, or the like. For example and without limitation, the automatic processing may recognize that many instances contain a hyperlink to a particular instance. Based upon this recognition the automatic processing may generate metadata 18 indicating that the particular instance is relatively important. Alternatively, this processing may include accepting a human input. For example and without limitation, the human input may comprise a tag that is associated with a folksonomy, collaborative tagging, social classification, social indexing, social tagging, or the like. Many examples of automatic processing and processing that accepts a human input will be appreciated and all such examples (and others) are intended to fall within the scope of the claims.

An RSS archival format 22 may specify embodiments of RSS items and/or RSS channels in association with metadata. In embodiments, an RSS archive may comprise data that is formatted according to the RSS archival format. It will be appreciated that such data could be stored in a database, a flat file system, a data stream, and so on. An example RSS archive, provided for the purpose of illustration and not limitation, is as follows:

```
<?xml version="1.0"?>
<rss version="2.0+metadata">
  <channel>
    <metadata class="automatic" style="importance">
      <importance>8</importance>
      <date-rated>10/27/06</date-rated>
    </metadata>
    <title>Example Channel</title>
    <link>http://example.com/</link>
    <description>My example channel</description>
    <item>
      <title>News for April the First</title>
      <link>http://example.com/2006/04/01</link>
```

-continued

```
        <description>Cats overran the city today</description>
        <metadata class="human-input" style="folksonomy">
            <tag>cats</tag>
            <tag>humor</tag>
        </metadata>
    </item>
    <item>
        <title>News for September the Second</title>
        <link>http://example.com/2006/09/02</link>
    </item>
  </channel>
</rss>
```

In the foregoing example, an RSS 2.0 feed includes an RSS channel and the RSS channel includes two RSS items. The RSS channel includes an instance of metadata, the metadata being of class "automatic" and style "importance". An automatic process of the analysis engine may generate this metadata. This metadata contains two elements, one of type "importance" and the other of type "date-rated". The importance element may be a score on 1-to-10 scale and the date-rate element may be the date on which the automatic process determined the importance. One of the RSS items also includes an instance of metadata, the metadata being of class "human-input" and style "folksonomy". A process of the analysis engine 16 and that accepts human input may generate this metadata. This metadata contains two elements, both of which are of type "tag". Each of these elements contain values ("cats" and "humor") that may have been provided to the automatic process by a human. In light of the foregoing example instance of an RSS archive, innumerable RSS archival formats will be appreciated and all such formats (and others) are intended to fall within the scope of the claims.

Figure 2:
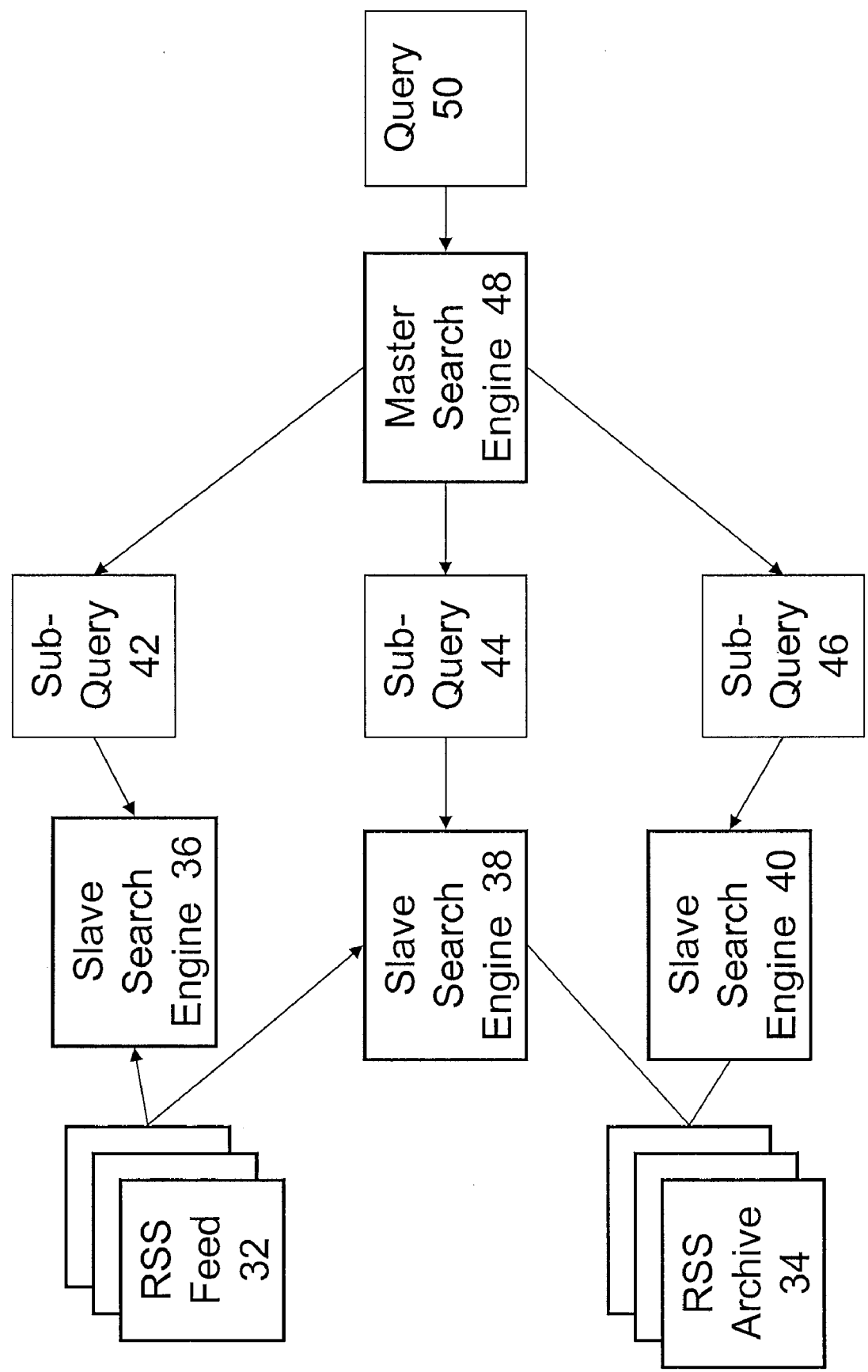
FIG. 2 is a block diagram of a system searching RSS feeds and RSS archives.

Referring now to FIG. 2, systems and methods for searching RSS feeds 32 and RSS archives 34 may comprise a plurality of RSS feeds, a plurality of RSS archives 34, a plurality of slave search engines, (e.g., slave search engines 36, 38 and 40), a plurality of sub-queries 32, (e.g., subqueries 42, 44 and 46), a master search engine 49, and a query 50. Some of the slave search engines, for example engines 36 and 38, may receive at least one of the RSS feeds 32. Some of the slave search engines, for example engines 38 and 40, may be associated with at least one of the RSS archives 34. Some of the slave search engines, for example engine 38, may both receive at least one of the RSS feeds 32 and be associated with at least one of the RSS archives 34.

The master search engine 46 may receive a query 50. The query 50 may be a structured query, an unstructured query, an XML query, an SQL query, and so on. In embodiments, a user or an automatic process may provide the query 50. For example and without limitation, a user may be interested in accessing all RSS items that relate to cats. The user may transmit a free-form text string (for example: "tuxedo cats") to the master search engine. The master search engine may receive this text string as the query.

In response to the query 50, the master search engine 48 may devise a query plan that involves communicating at least one sub-query, (e.g., one of queries 42, 44 and 46), to at least one of the slave search engines (36, 38, 40). The sub-queries 42, 44, and 46 may be formatted according to any and all query languages and formats. In embodiments, the master search engine 48 may submit the sub-queries 42, 44 and 46 to the slave search engines 36, 38 and 40 via SOAP, via a REST-ful interface, via an API, via a remote procedure call, and so on. In embodiments, the master search engine 48 may be operatively coupled to the slave search engines 36, 38 and 40 via the Internet, a public network, a private network, a virtual private network, and so on. In embodiments, the master search engine 48 and the slave search engines 36, 38 and 40 may operate under separate administrative control and the sub-queries 42, 44 and 46 may be transmitted via a public interface, a protected interface, a private interface, or the like.

In embodiments, the slave search engines 36, 38 and 40 may exist as public services that are operated independently from one another. For example and without limitation, the following RSS search engines may be employed as slave search engines: Bloglines, BlogPulse, Daypop, Feedster, Findory Blogory, Gigablast Blog Search, IceRocket Blog Search, PubSub, and Technorati. In addition, slave search engines may include proprietary archives of RSS content that are not open to public use, or that require registration, login, subscription fees, or the like. Each of the slave search engines may implement an interface, query format, feature set, search capability, or the like that differs from another one of the slave search engines.

In embodiments, the master search engine 44 may encompass a library or collection of bridges, adaptors, converters, interfaces, or the like that enable the master search engine to communicate sub-queries in a plurality of query formats and with respect to a plurality of interfaces, feature sets, search capabilities, and the like. In any case, the master search engine may prepare a plurality of sub-queries in response to the query 50. Each of the sub-queries 42, 44 and 46 may be tailored to one of the slave search engines 36, 38 and 40. The master search engine 48 communicates the sub-queries 42, 44 and 46 to the corresponding slave search engines 36, 38 and 40.

While in the example described above in relation to FIG. 2, three slave search engines and three sub-queries have been described, any number of save search engines can be associated with the master search engine and each slave engine can receive one or more sub-queries.

Figure 3:
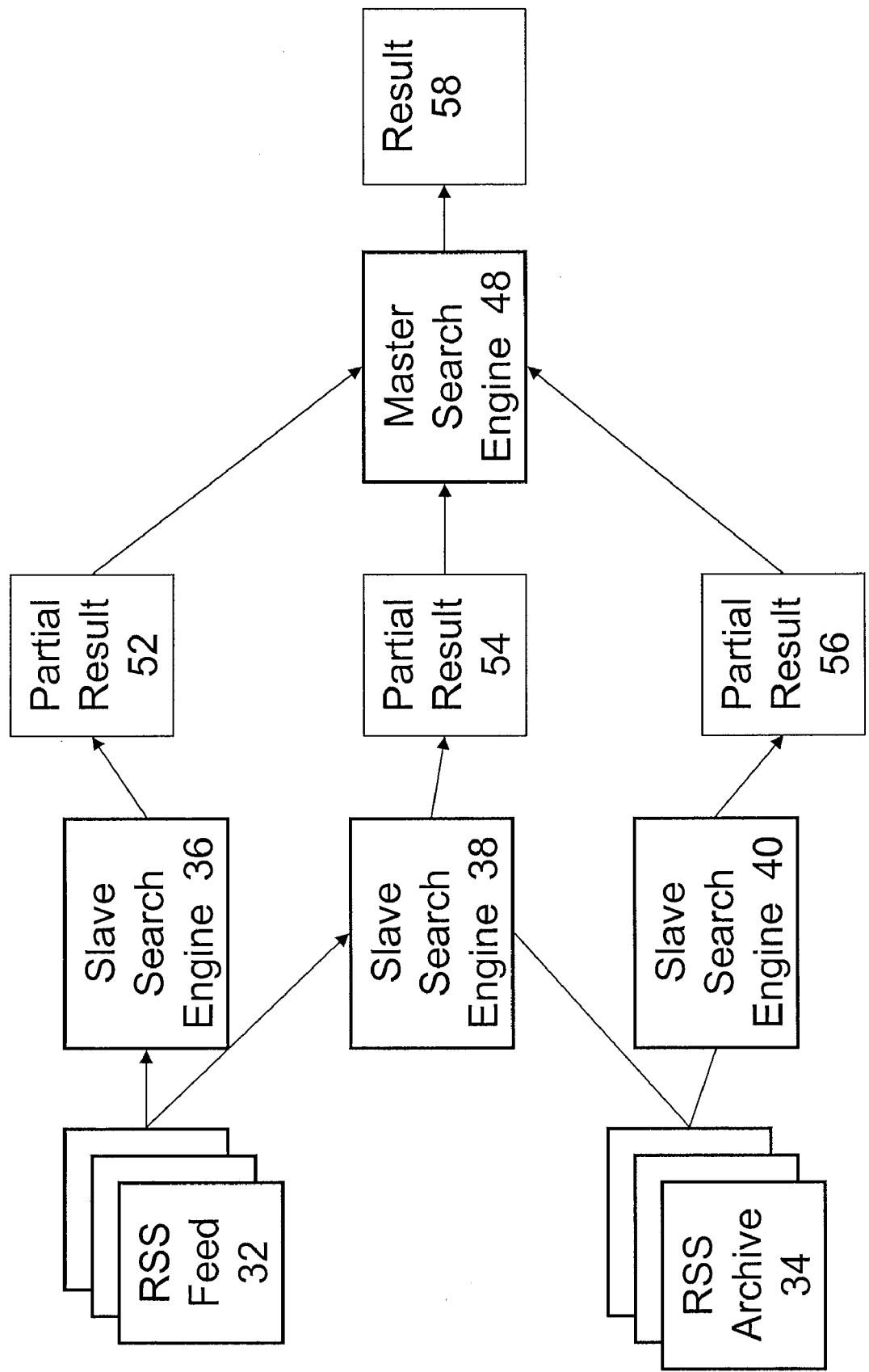
FIG. 3 is a block diagram of a system searching RSS feeds and RSS archives.

Referring now to FIG. 3, each of the slave search engines 36, 38 and 40 may generate a partial result, (e.g., partial results 52, 54 and 56), in response to the sub-query that it received. As with the sub-queries, each of the partial results 52, 54 and 56 may be formatted or structured in a way that differs from another partial result. The master search engine 48 receives the partial results 52, 54 and 56 from the slave search engines 36, 38 and 40. The library or collection of bridges, adaptors, converters, interfaces, or the like that enable the master search engine 48 to communicate sub-queries may also enable the master search engine 48 to receive partial results 52, 54 and 56 from a plurality of slave search engines 36, 38 and 40 and in a plurality of formats.

Any and all of the partial results may comprise metadata, RSS feeds, RSS archives, RSS items, XML, or any and all other forms of data. The master search engine 48 may combine some or all of the partial results 52, 54 and 56 into a single result 58, which itself may comprise a plurality of elements. This result may be formatted as an HTML page, an RSS feed, a database table, a combination of any and all of the foregoing, or the like. All together, the partial results may contain duplicate or near-duplicate RSS items, RSS feeds, RSS archives, and the like. To compensate for this, embodiments of the result may contain one element that is representative of the duplicate or near-duplicate elements plus a hyperlink or the like that is associated with this one element, the hyperlink providing access to all of the duplicate or near-duplicate elements of this one element.

Embodiments of the master search engine may provide a web portal with an HTML form or the like into which a user may enter a query. Embodiments of the master search engine may provide an API or programmatic interface for communicating queries and results.

Archiving Content

Various services may be provided based upon a content archive, which may include archiving for RSS data, HTML data, OPML data, or any other XML data and the like, as well as media and other content files associated with any of the foregoing.

In one aspect, a search engine may be provided that spans multiple archives of RSS content. Thus, where multiple archives exist for content, a meta search engine may be provided to span content in all such archives. This may include searching of archives provided by various RSS content providers, as well as independent or third-party archives discovered and explored using, e.g., spiders, link analysis, and so forth.

Another service may provide user-configurable archiving. In one aspect, this provides a user with a persistent store of data for one or more RSS feeds or the like, so that content of interest can be preserved regardless of the persistence of the feed source. Such archives may be prepared based upon original source content, aggregated content, and so forth. In creating such an archive, a user may specify one or more sources, and may specify archiving parameters such as frequency of archiving (e.g., hourly, daily, weekly, monthly, etc.), storage capacity, link depth (such as whether and how links within an archived item are navigated/stored), and so forth. A user may also specify access credentials for secure content where appropriate.

More generally, any web content may be periodically archived under user control. Thus, for example, a user may specify locations of interest and have these locations periodically archived to provide both persistence and a time-based view of content at these locations. This service may be usefully employed, for example, to archive a user's web content such as social networking pages, professional web sites, and so forth. The service may also, or instead, be usefully employed to periodically capture competitive data, time-based commentary, subject-matter-based news items, and so forth, any or all of which may be archived for subsequent retrieval and review by the user. Archiving instructions may also include, for example, login credentials or the like for accessing proprietary content of the user, or content to which the user is a paid subscriber. The system may usefully explore links within archived content, and archive some or all of the linked content as well. This link depth may be specified by the user in either absolute terms (e.g., archive one-link content, two-link content, etc.), or in relative terms (e.g., all links within domain, all links having a certain path, etc.). In one embodiment, such a service may be used in a content management system to archive and/or audit content on a website or the like.

In one aspect, a web archiving service may be combined with a desktop backup client so that a user can specify, within a single interface, both local files and remote content for archiving within a single interface or operation.

The system described herein can be implemented in digital electronic circuitry, or in computer hardware, firmware, software, web-enabled applications, or in combinations thereof. Data structures used to represent information provided by the patient can be stored in memory and in persistence storage. Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

Other implementations are within the scope of the following claims.

What is claimed is:

1. A method comprising:
processing two or more independent RSS data feeds to generate two or more RSS market-specific searchable RSS datafeed archives,
generating, using a master search engine operating on at least one computer server, a query plan based on an input received from a user;
applying, using slave search engines, at least two different sub-queries to the searchable RSS datafeed archives to derive information based on data in the searchable RSS datafeed archives, the sub-queries being part of the query plan to determine a result based on the derived information, wherein:
at least one of the sub-queries is applied to at least two of the searchable RSS datafeed archives, and
at least two of the sub-queries are applied to the same searchable RSS datafeed archive;
determining the result based on the derived information, and
generating and serving by a computer server an RSS feed that includes the result.

2. The method of claim 1, wherein the market-specific datafeed archives comprise one or more of a real estate datafeed archive, a medical datafeed archive and a financial datafeed archive.

3. The method of claim 1, wherein processing the two or more independent data feeds comprises storing metadata and an automatically generated importance value.

4. The method of claim 1, wherein determining the result comprises receiving sub-results from one or more of the at least two different sub-queries, the sub-results differing in structure and format, and combining the sub-results to generate the result.

5. The method of claim 4, wherein combining the sub-results comprises identifying a first sub-result that is a duplicate or near duplicate of a second sub-result and generating a hyperlink to the second sub-result.

6. The method of claim 1, wherein the slave search engines comprise public services.

7. The method of claim 6, wherein the public services are operated independently from one another.

8. A method comprising:

processing two or more independent data feeds to generate two or more searchable RSS datafeed archives, applying at least two different sub-queries to the searchable RSS datafeed archives to derive information based on data in the searchable RSS datafeed archives, the sub-queries being part of a query plan to determine a result based on the derived information, at least one of the sub-queries being applied to at least two of the searchable RSS datafeed archives, at least two of the sub-queries are applied to the same searchable RSS datafeed archive;

determining the result based on the derived information, and providing the result by at least one computer server for use in a real-world application.

9. The method of claim 8, wherein processing the two or more independent data feeds comprises processing the two or more independent datafeeds to generate market specific datafeed archives.

10. The method of claim 9, wherein the market specific datafeed archives comprise one or more of a real estate datafeed archive, a medical datafeed archive and a financial datafeed archive.

11. The method of claim 8, wherein processing the two or more independent data feeds comprises storing metadata and an automatically generated importance value.

12. The method of claim 8, further comprising generating the query plan based on an input received from a user.

13. The method of claim 12, wherein generating the query plan comprises using a master engine to generate the probe plan.

14. The method of claim 8, wherein the sub-queries have different structures.

15. The method of claim 8, wherein determining the result comprises receiving sub-results from one or more of the sub-queries, the sub-results differing in structure and format, and combining the sub-results to generate the result.

16. The method of claim 15, wherein combining the sub-results comprises identifying a first sub-result that is a duplicate or near duplicate of a second sub-result and generating a hyperlink to the second sub-result.

17. The method of claim 8, wherein providing the result comprises generating an RSS feed that includes the result.

* * * * *